(12) United States Patent
Heap (10) Patent No.: US 8,321,100 B2
(45) Date of Patent: Nov. 27, 2012

(54) METHOD AND APPARATUS FOR DYNAMIC OUTPUT TORQUE LIMITING FOR A HYBRID POWERTRAIN SYSTEM

(75) Inventor: Anthony H. Heap, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 807 days.

(21) Appl. No.: 12/254,862

(22) Filed: Oct. 21, 2008

(65) Prior Publication Data

US 2009/0118941 A1    May 7, 2009

Related U.S. Application Data

(60) Provisional application No. 60/985,369, filed on Nov. 5, 2007.

(51) Int. Cl.
G06F 7/00    (2006.01)

(52) U.S. Cl. .......... 701/54; 701/22; 701/51; 701/60; 701/87; 477/3; 477/5; 318/9

(58) Field of Classification Search .............. 701/22, 701/51, 54, 60, 87; 477/3, 5; 318/9
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 * | 12/2006 | Heap | ................. 318/9 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 * | 4/2005 | Hubbard et al. | ................. 701/54 |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |

(Continued)

Primary Examiner — James Trammell
Assistant Examiner — Sanjeev Malhotra (57) ABSTRACT

A powertrain system includes a hybrid transmission device operative to transfer power between an input member and torque machines and an output member in one of a plurality of operating range states. The torque machines are connected to an energy storage device. A method for operating the powertrain system includes determining a permissible range of input operating points to the input member, determining ranges of motor torques for the torque machines, determining an available power range from the energy storage device, selecting a candidate input operating point within the permissible range of input operating points, and determining maximum and minimum achievable output torques transferable to the output member for the candidate engine operating point within the ranges of motor torques for the torque machines and within the available power range from the energy storage device in a candidate operating range state.

7 Claims, 6 Drawing Sheets

U.S. PATENT DOCUMENTS

| | | |
|---|---|---|
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1* | 11/2005 | Tao et al. ................. 701/87 |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1* | 4/2007 | Cawthorne et al. ........... 701/51 |
| 2007/0093953 A1 | 4/2007 | Heap |
| 2007/0149348 A1* | 6/2007 | Holmes et al. ............... 477/3 |
| 2007/0191181 A1 | 8/2007 | Burns |
| 2007/0225886 A1 | 9/2007 | Morris |
| 2007/0225887 A1 | 9/2007 | Morris |
| 2007/0225888 A1* | 9/2007 | Morris .......................... 701/51 |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1* | 3/2008 | Cawthorne et al. ............... 477/5 |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1* | 4/2009 | Tamai et al. ................. 701/22 |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1* | 4/2009 | Heap et al. ................. 701/22 |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh et al. |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |

| | | | | | |
|---|---|---|---|---|---|
| 2009/0118936 A1 | 5/2009 | Heap | 2009/0118950 A1 | 5/2009 | Heap |
| 2009/0118937 A1 | 5/2009 | Heap | 2009/0118951 A1 | 5/2009 | Heap |
| 2009/0118938 A1 | 5/2009 | Heap | 2009/0118952 A1 | 5/2009 | Heap |
| 2009/0118939 A1 | 5/2009 | Heap | 2009/0118954 A1 * | 5/2009 | Wu et al. ............ 701/60 |
| 2009/0118940 A1 | 5/2009 | Heap | 2009/0118957 A1 | 5/2009 | Heap |
| 2009/0118942 A1 | 5/2009 | Hsieh | 2009/0118962 A1 | 5/2009 | Heap |
| 2009/0118943 A1 | 5/2009 | Heap | 2009/0118963 A1 | 5/2009 | Heap |
| 2009/0118944 A1 | 5/2009 | Heap | 2009/0118964 A1 | 5/2009 | Snyder |
| 2009/0118945 A1 | 5/2009 | Heap | 2009/0118969 A1 | 5/2009 | Heap |
| 2009/0118946 A1 | 5/2009 | Heap | 2009/0118971 A1 | 5/2009 | Heap |
| 2009/0118947 A1 | 5/2009 | Heap | 2009/0118999 A1 | 5/2009 | Heap |
| 2009/0118948 A1 | 5/2009 | Heap | 2009/0144002 A1 | 6/2009 | Zettel |
| 2009/0118949 A1 | 5/2009 | Heap | | | |

* cited by examiner

METHOD AND APPARATUS FOR DYNAMIC OUTPUT TORQUE LIMITING FOR A HYBRID POWERTRAIN SYSTEM

CROSS REFERENCE TO RELATED APPLICATIONS

This application claims the benefit of U.S. Provisional Application No. 60/985,369, filed on Nov. 5, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-machines, and regulating the power interchange among the energy storage device and the machines to manage outputs of the transmission, including torque and rotational speed.

SUMMARY

A powertrain system includes a hybrid transmission device operative to transfer power between an input member and torque machines and an output member in one of a plurality of operating range states. The torque machines are connected to an energy storage device. A method for operating the powertrain system includes determining a permissible range of input operating points to the input member, determining ranges of motor torques for the torque machines, determining an available power range from the energy storage device, selecting a candidate input operating point within the permissible range of input operating points, and determining maximum and minimum achievable output torques transferable to the output member for the candidate engine operating point within the ranges of motor torques for the torque machines and within the available power range from the energy storage device in a candidate operating range state.

BRIEF DESCRIPTION OF THE DRAWINGS

One or more embodiments will now be described, by way of example, with reference to the accompanying drawings, in which.

DETAILED DESCRIPTION

Figure 1:
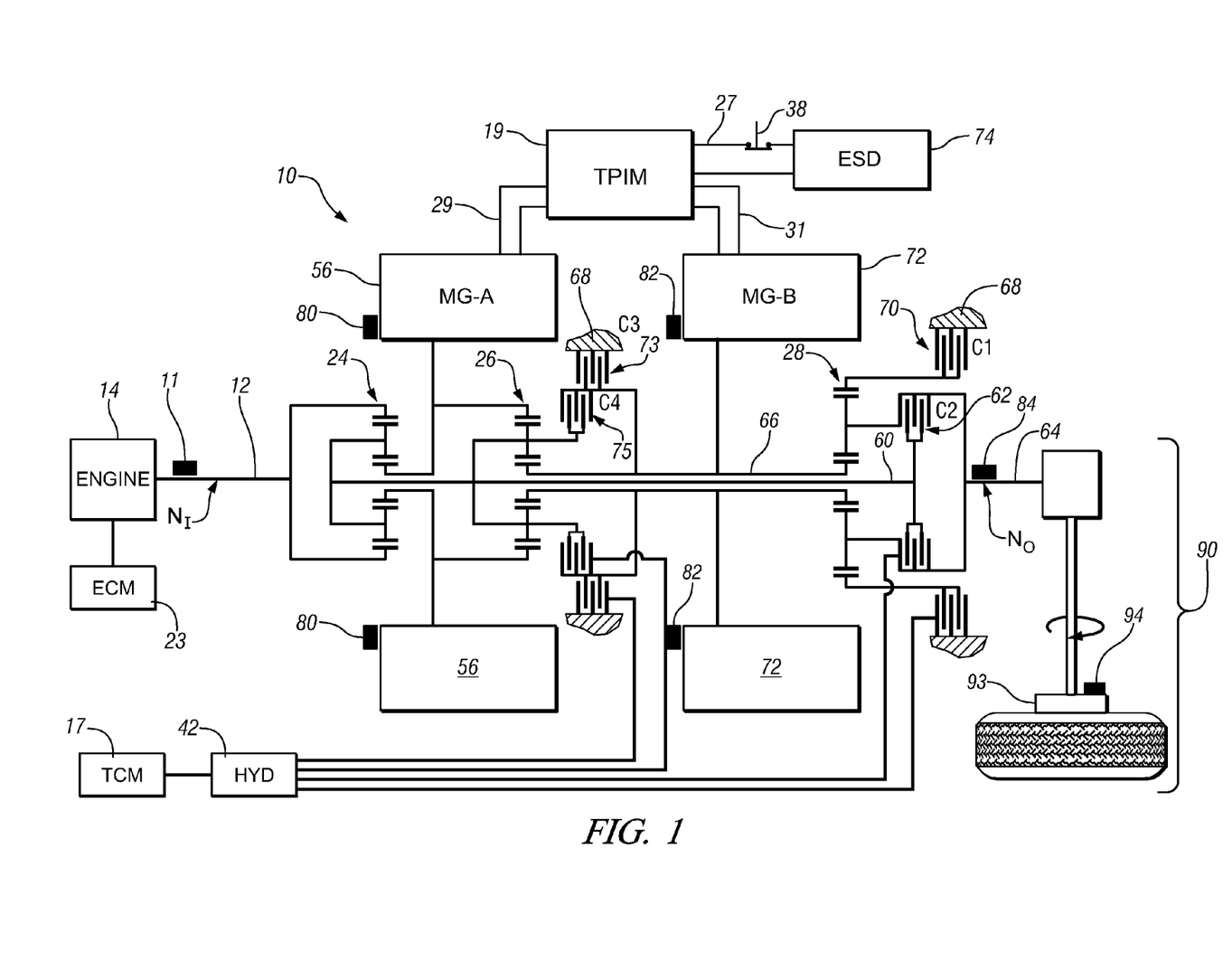
FIG. 1 is a schematic diagram of an exemplary hybrid powertrain, in accordance with the present disclosure.
Figure 2:
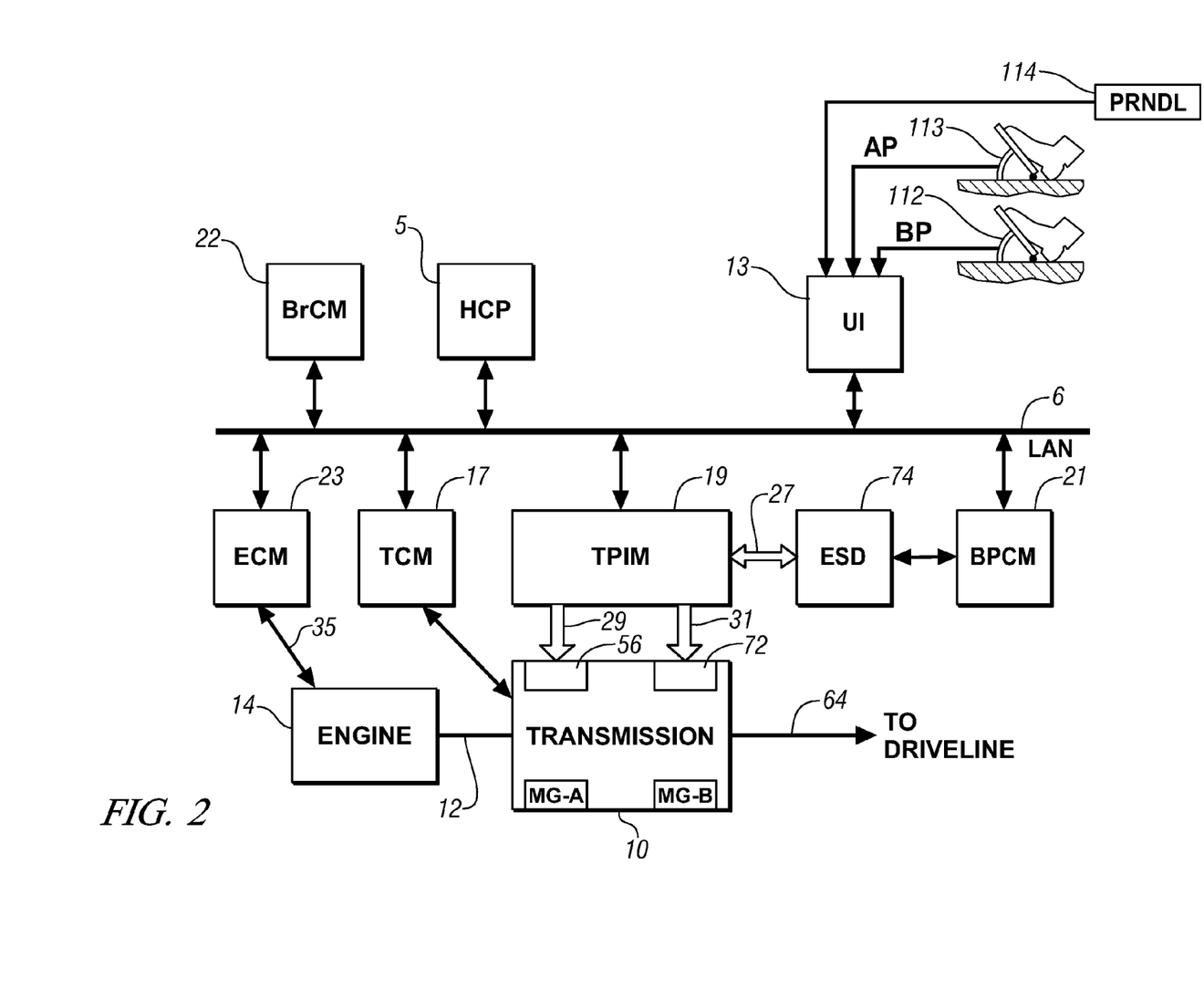
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electro-mechanical hybrid transmission 10 operatively connected to an engine 14 and torque generating machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and output torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19 and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the motor torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, a brake control module (hereafter 'BrCM') 22, and the TPIM 19. A hybrid control module (hereafter 'HCP') 5 provides supervisory control and coordination of the ECM 23, the TCM 17, the BPCM 21, the BrCM 22 and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines various commands, including: the operator torque request, an output torque command ('To_cmd') to the driveline 90, an engine input torque command, clutch torque(s) ('$T_{CL}$') for the applied torque-transfer clutches C1 70, C2 62, C3 73, C4 75 of the transmission 10; and the torque commands $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 signally connects to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

The brake control module (hereafter 'BrCM') 22 is operatively connected to friction brakes on each of the vehicle wheels 93. Braking preferably comprises a blending of friction braking and regenerative braking. The BrCM 22 monitors the operator input to the brake pedal 112 and determines a net operator input to the brake pedal 112 and the accelerator pedal 113. The BrCM 22 commands friction braking by applying the friction brakes and commands the powertrain system including the transmission 10 to create a negative output torque to react with the driveline 90. The electro-mechanical transmission 10 and the engine 14 can generate a negative output torque that reacts with the driveline 90. The negative output torque reacted through the electro-mechanical transmission 10 can be transferred to the first and second electric machines 56 and 72 to generate electric power for storage in the ESD 74. The regenerative braking is effected through the driveline 90 by selectively applying one of the clutches and controlling the first and second electric machines 56 and 72 to react torque transferred from the driveline 90 through the power inverters and respective motor control modules to meet the commanded motor torques $T_A$ and $T_B$ which are determined based upon the negative output torque. The applied braking force and the negative output torque can decelerate and stop the vehicle so long as they are sufficient to overcome vehicle kinetic power at the wheel(s) 93.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode I | C1 70 | |
| M1_Eng_On | ON | EVT Mode I | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input member 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, the output torque command from the transmission 10 to the driveline 90, the input torque from the engine 14, clutch torques for the torque-transfer clutches C1 70, C2 62, C3 73, C4 75 of the transmission 10 and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request, communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the output torque command at output member 64 preferably to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
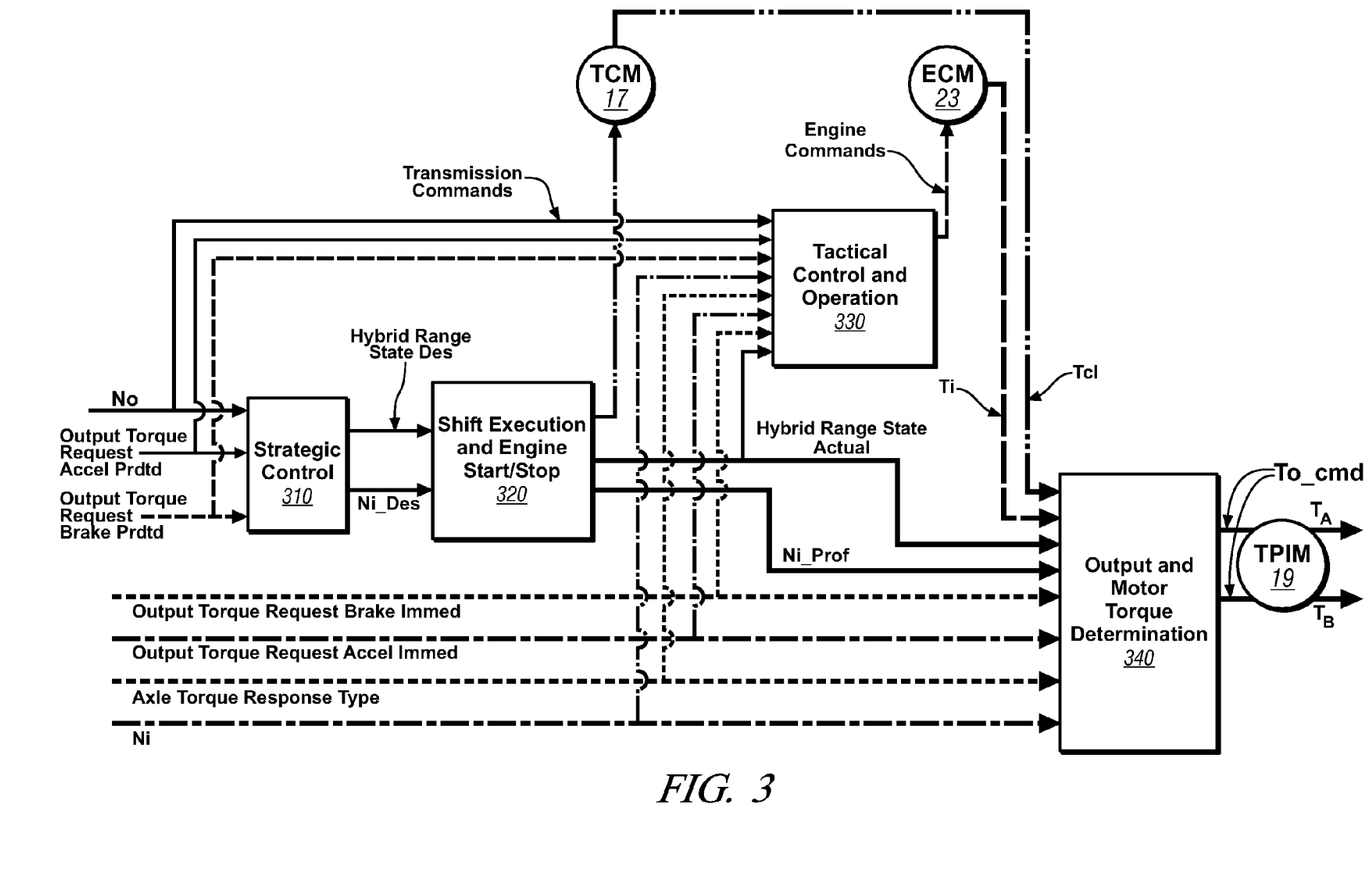
FIGS. 3 and 4 are schematic flow diagrams of a control scheme, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque machines and energy storage systems, e.g., hydraulic-mechanical hybrid transmissions using hydraulically powered torque machines (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

The immediate accelerator output torque request comprises an immediate torque request determined based upon the operator input to the accelerator pedal 113. The control system controls the output torque from the hybrid powertrain system in response to the immediate accelerator output torque request to cause positive acceleration of the vehicle. The immediate brake output torque request comprises an immediate braking request determined based upon the operator input to the brake pedal 112. The control system controls the output torque from the hybrid powertrain system in response to the immediate brake output torque request to cause deceleration, or negative acceleration, of the vehicle. Vehicle deceleration effected by control of the output torque from the hybrid powertrain system is combined with vehicle deceleration effected by a vehicle braking system (not shown) to decelerate the vehicle to achieve the immediate braking request.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to changes to the output torque command related to the antilock braking, traction control, or vehicle stability control.

The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

Blended brake torque includes a combination of the friction braking torque generated at the wheels 93 and the output torque generated at the output member 64 which reacts with the driveline 90 to decelerate the vehicle in response to the operator input to the brake pedal 112. The BrCM 22 commands the friction brakes on the wheels 93 to apply braking force and generates a command for the transmission 10 to create a negative output torque which reacts with the driveline 90 in response to the immediate braking request. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electro-mechanical transmission 10 and the engine 14. The negative output torque reacted through the electro-mechanical transmission 10 can be transferred to the first and second electric machines 56 and 72 to generate electric power for storage in the ESD 74.

A strategic optimization control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic optimization control scheme 310. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tc1') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that preferably meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

A change in the input torque from the engine 14 which reacts with the input member 12 from the transmission 10 can be effected by changing mass of intake air to the engine 14 by controlling position of an engine throttle utilizing an electronic throttle control system (not shown), including opening the engine throttle to increase engine torque and closing the engine throttle to decrease engine torque. Changes in the input torque from the engine 14 can be effected by adjusting ignition timing, including retarding spark timing from a mean-best-torque spark timing to decrease engine torque. The engine state can be changed between the engine-off state and the engine-on state to effect a change in the input torque. The engine state can be changed between the all-cylinder operating state and the cylinder deactivation operating state, wherein a portion of the engine cylinders are unfueled. The engine state can be changed by selectively operating the engine 14 in one of the fueled state and the fuel cutoff state wherein the engine is rotating and unfueled. Executing a shift in the transmission 10 from a first operating range state to a second operating range state can be commanded and achieved by selectively applying and deactivating the clutches C1 70, C2 62, C3 73, and C4 75.

During ongoing operation of the powertrain system, the control system described with reference to FIG. 3 executes code to evaluate candidate engine operating points for one or more candidate operating range states to determine a preferred engine operating point for the engine 14, determine a preferred operating range state for the transmission 10, and preferred motor torques for controlling the first and second electric machines 56 and 72 in response to the operator torque request and to meet the output torque command.

This includes the control system evaluating a plurality of candidate engine operating points within a permissible range of engine operating points for one or more candidate transmission operating range states in the strategic optimization control scheme 310, and evaluating a plurality of candidate engine operating points within a permissible range of engine operating points in the tactical control scheme 330. Each of the candidate engine operating points is evaluated to determine a preferred engine operating point and a preferred operating cost for operating the powertrain system at a present operating range state in response to the operator torque request. These evaluations result in a feed-forward constraining and control of the input torque based upon the ability of the powertrain to achieve the operator torque request.

Figure 4:
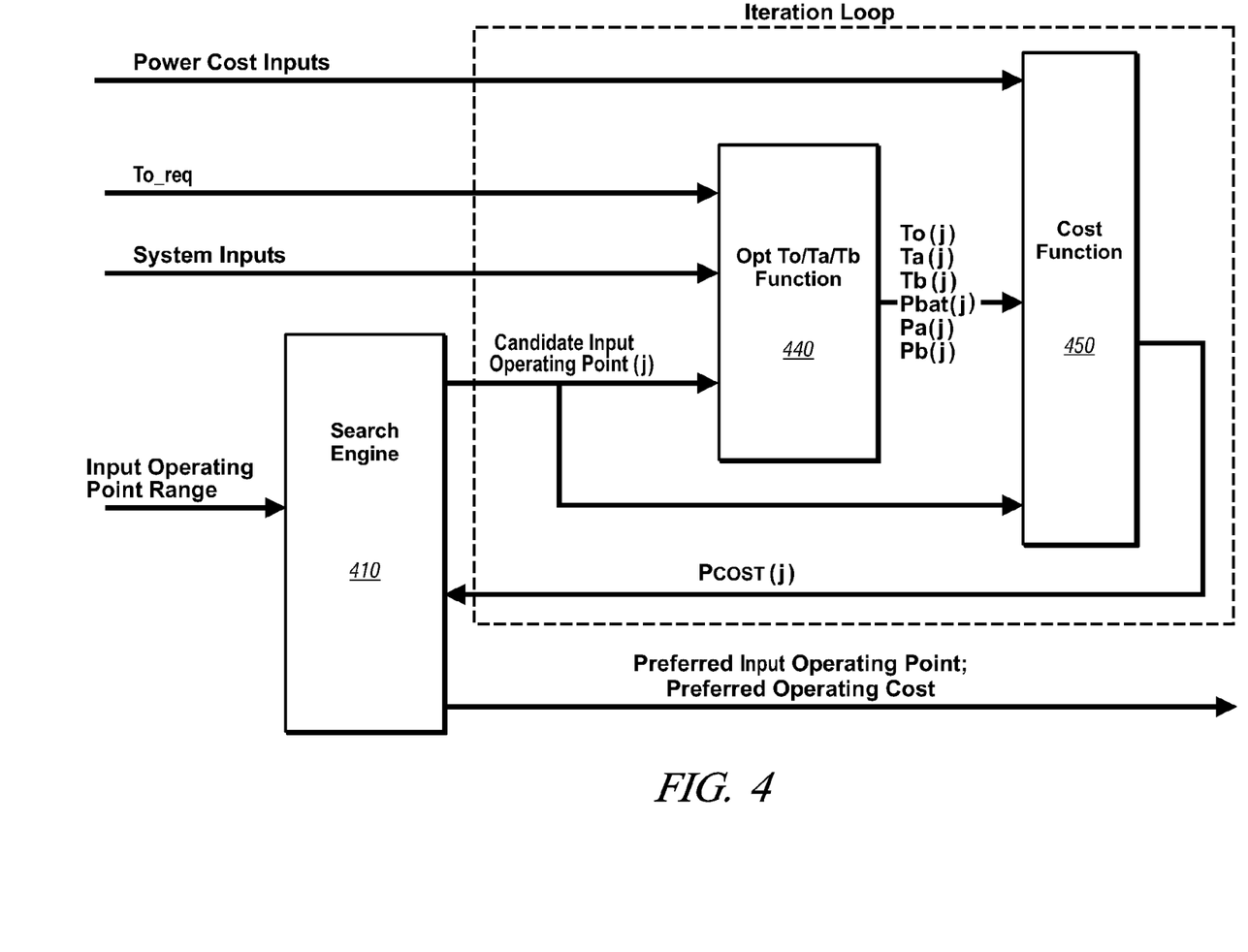

FIG. 4 schematically shows an exemplary search scheme for evaluating candidate engine operating points to determine a preferred operating cost for operating the powertrain system in response to the operator torque request and an associated preferred engine operating point. There is a permissible range of input operating points, e.g., engine operating points in one embodiment that can be characterized in terms of the input speed $N_I$, the input torque $T_I$, and input power $P_I$. There are achievable ranges of motor torques for the torque machines, e.g., the first and second electric machines 56 and 72 in one embodiment, and there is a range of available power range from the ESD 74.

Evaluating a plurality of candidate engine operating points within the permissible range of engine operating points preferably includes executing a search. Each search includes a search engine 410 that iteratively selects a candidate engine operating point ('Candidate Input Operating Point(j)') from the permissible range of input operating points ('Input Operating Point Range'). An optimization function ('Opt To/Ta/Tb Function') 440 has inputs including power cost inputs ('Power Cost Inputs') and penalty costs (not shown), the operator torque request ('To_req'), system inputs ('System Inputs'), and the candidate engine operating point. The system inputs include including ranges of motor torques for the torque machines, ranges of clutch reactive torques, and the available power range from the energy storage device and the output torque command, and other related inputs. The optimization function 440 calculates, for each candidate engine operating point designated by (j), a range of achievable output torques, a preferred output torque ('To(j)') preferred motor torques ('Ta(j)', 'Tb(j)'), preferred motor powers ('Pa(j)', 'Pb(j)') and a preferred battery power ('Pbat(j)'). The outputs of the optimization function 440 are input to a cost function 450 along with the power cost inputs and penalty cost inputs. The cost function 450 calculates a cost ('Pcost(j)') for operating the powertrain system at the candidate engine operating point in an attempt to achieve the operator torque request. The search engine 410 iteratively selects the candidate engine operating points within the permissible range of engine operating points and executes the optimization function 440 and cost function 450 to determine the cost ('Pcost(j)') for operating the powertrain system at the candidate engine operating point. The search engine 410 executes a quantity of iterations and identifies a preferred operating cost ('Preferred Operating Cost') and a corresponding preferred engine operating point ('Preferred Input Operating Point') preferably comprising the candidate operating point having a minimum cost to operate the powertrain. When executing searches in the strategic optimization control scheme 310, a preferred engine operating point is simultaneously determined for each transmission operating range state, in order to select a preferred operating range state.

The cost function 450 determines penalty costs and power costs for operating the engine 14 and the powertrain system at the preferred output torque, the preferred motor torques, the preferred motor powers and the preferred battery power. The power costs include operating costs which are determined based upon factors that include mechanical power loss in the form of friction and spin losses, electrical power losses related to heat generation and internal resistances and current flow, and parasitic losses. During a braking event, the power costs include kinetic power loss due to unrecovered kinetic energy that is expended in the form of heat generation in the friction brakes, which can be recovered as electric power through regenerative braking. Costs are assigned and associated with fuel and electrical power consumption and are associated with a specific operating points of the hybrid powertrain. Lower power costs are associated with lower fuel consumption at high conversion efficiencies, lower battery power usage, and lower emissions for each engine speed/load operating point, and take into account the present operating state of the engine 14. Penalty costs are costs associated with not achieving a commanded output torque, and can be based upon a difference between the operator torque request and the output torque from the powertrain.

Figure 6:
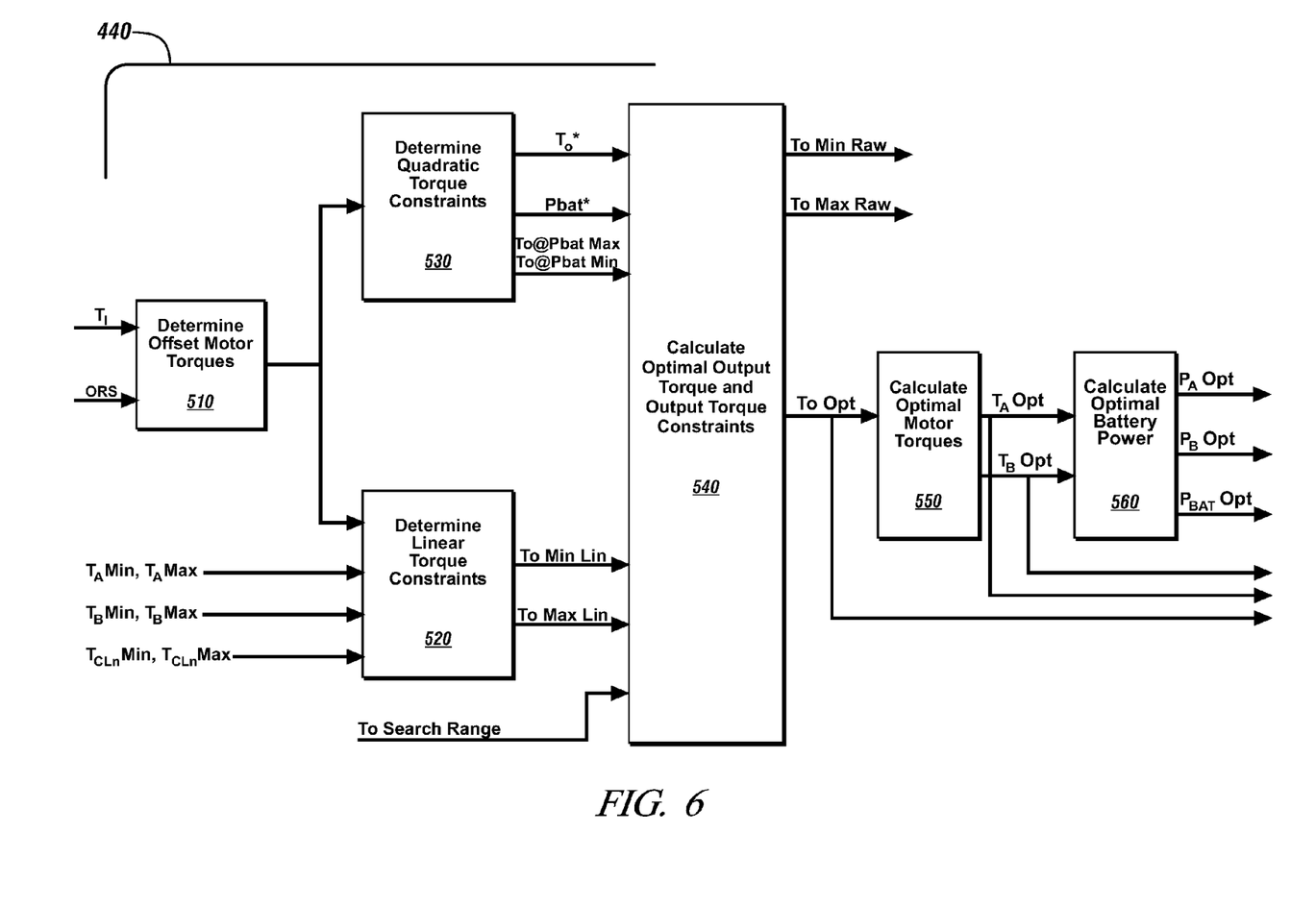
FIG. 6 is a schematic flow diagram of a control scheme, in accordance with the present disclosure.

FIG. 6 schematically shows details the optimization function 440 which includes monitoring present operating conditions of the electro-mechanical hybrid powertrain, e.g., the powertrain system described hereinabove. Offset motor torques for the first and second electric machines 56 and 72 can be calculated based upon inputs including the operating range state ('ORS') of the transmission 10, the input torque ('$T_I$') and other terms based upon system inertias, system damping, and clutch slippage (510).

The control system executes an algorithm to determine linear torque constraints to the output torque (520). The linear torque constraints comprise a plurality of system constraints that achieve a linear change in the output torque with a linear change in one of the constraints. The system constraints describe a capability of the hybrid transmission 10 to transfer and convert electric power to mechanical torque through the first and second electric machines 56 and 72. Inputs associated with the linear torque constraints include motor torque constraints comprising minimum and maximum achievable motor torques for the first and second electric machines 56 and 72 ('$T_A$Min', '$T_A$Max', '$T_B$Min', and '$T_B$Max'), and minimum and maximum clutch reactive torques for applied clutch(es) for first and where necessary, second applied clutches ('$T_{CLn}$Min', '$T_{CLn}$Max') and immediate or present torque, speed, and electric power inputs. Minimum and maximum linear output torques ('To Min Lin', 'To Max Lin') can be determined based upon the minimum and maximum achievable motor torques for the first and second electric machines 56 and 72 and the minimum and maximum clutch reactive torques for the applied clutch(es). The minimum and maximum linear output torques are the minimum and maximum output torques that meet the motor torque constraints and also meet the applied clutch torque constraints. The minimum and maximum linear output torques ('To Min Lin', 'To Max Lin') translate to the minimum and maximum raw output torques ('To Min Raw', 'To Max Raw')

The control system executes an algorithm to determine quadratic torque constraints to the output torque (530). The quadratic torque constraints comprise a plurality of system constraints that achieve a quadratic change in the output torque with a linear change in one of the constraints. Constraint inputs include the available battery power (not shown) for an exemplary system (530). The available battery power for the energy storage device 74 can be represented mathematically as a function of the transmission output torque To as shown:

$$P_{BAT}(T_O) = (a_1^2 + b_1^2)(T_O - T_O^*)^2 + P_{BAT}^* \quad [1]$$

wherein $a_1$ and $b_1$ represent scalar values determined for the specific application. Eq. 1 can be solved for the output torque, as shown:

$$T_O(P_{BAT}) = T_O^* \pm \sqrt{\frac{P_{BAT} - P_{BAT}^*}{a_1^2 + b_1^2}} \quad [2]$$

For the available battery power range $P_{BAT\_MIN}$ to $P_{BAT\_MAX}$, four distinct output torques can be determined from Eq. 2, including maximum and minimum quadratic output torque constraints for the positive root case and minimum and maximum quadratic output torque constraints for the negative root case ('To@$P_{BAT}$ Max' and 'To@$P_{BAT}$ Min'), and represent achievable ranges for the output torque based upon the battery power, depending on whether discharging, i.e., the positive root case, or charging, i.e., the negative root case.

The preferred output torque ('To Opt') can be determined based upon the optimized output torque ('To*'), the optimized battery power ('$P_{BAT}$*'), the maximum and minimum linear output torques, the minimum and maximum quadratic output torque constraints ('To@$P_{BAT}$ Max' and 'To@$P_{BAT}$ Min') selected based upon whether charging or discharging, and the output torque search range ('To Search Range'). The output torque search range ('To Search Range') preferably comprises the immediate accelerator output torque request ('To_req') when operating in a tractive torque generating state to forwardly propel the vehicle. The output torque search range ('To Search Range') preferably comprises a range between the immediate accelerator output torque request and a brake torque request when operating in a regenerative braking state to slow the vehicle. Determining the preferred output torque can include selecting a temporary output torque comprising a minimum torque value of the search range for the output torque and the maximum output torque. The preferred output torque ('To Opt') is selected as the maximum of the temporary output torque, the minimum output torque determined based upon one of the quadratic output torque constraints and clutch torque constraints, and the minimum linear output torque (540). The preferred output torque ('To Opt') is determined based upon inputs including the immediate accelerator output torque request. The preferred output torque ('To Opt') translates to the preferred output torque ('Too)') output from the optimization function 440.

The preferred output torque ('To Opt') is subject to output torque constraints comprising the minimum and maximum unfiltered output torques ('To Min Raw', 'To Max Raw') and is determined based upon the range of allowable output torques, which can vary, and may comprise the immediate accelerator output torque request. The preferred output torque may comprise an output torque corresponding to a minimum battery discharge power or an output torque corresponding to a maximum battery charge power. The preferred output torque is based upon a capacity of the powertrain to transmit and convert electric power to mechanical torque through the first and second electric machines 56 and 72, and the immediate or present torque, speed, and reactive clutch torque constraints, and electric power inputs thereto. The output torque constraints including the minimum and maximum unfiltered output torques ('To Min Raw', 'To Max Raw') and the preferred output torque ('To Opt') can be determined by executing and solving an optimization function in one of the operating range states for neutral, mode and fixed gear operation. The optimization function 440 comprises a plurality of linear equations implemented in an executable algorithm and solved during ongoing operation of the system to determine the preferred output torque range to minimize battery power consumption and meet the operator torque request. Each of the linear equations takes into account the input torque ('Ti'), system inertias and linear damping. Preferably, there are linear equations specific to each of the operating range states for neutral, mode and fixed gear operations.

The output torque constraints comprise a preferred output torque range at the present input torque, within the available battery power and within the motor torque constraints subject to the reactive clutch torques of the applied torque transfer clutches. The output torque command is constrained within maximum and minimum output torque capacities. In fixed gear and mode operation, the preferred output torque can comprise the output torque which maximizes charging of the ESD 74. In neutral, the preferred output torque is calculated. In fixed gear operation, the preferred output torque can include the preferred torque split between the first and second electric machines 56 and 72 while meeting the reactive clutch torque constraints.

Preferred motor torques and battery powers ('$T_A$ Opt', '$T_B$ Opt', and '$P_{BAT}$ Opt') can be determined based upon the preferred output torque, and used to control operation of the powertrain system. The preferred motor torques comprise motor torques which minimize power flow from the ESD 74 and achieve the preferred output torque. Torque outputs from the first and second electric machines 56 and 72 are controlled based upon the determined minimum power flow from the ESD 74, which is the preferred battery power ('$P_{BAT}$ Opt'). Torque output is controlled based upon the engine input torque and the motor torque commands for the first and second electric machines 56 and 72, ('$T_A$ Opt', '$T_B$ Opt') respectively, which minimizes the power flow from the ESD 74 to meet the preferred output torque. The battery powers associated with the motors ('$P_A$ Opt' and '$P_B$ Opt', respectively) can be determined based upon the torque commands (560).

Figure 5:
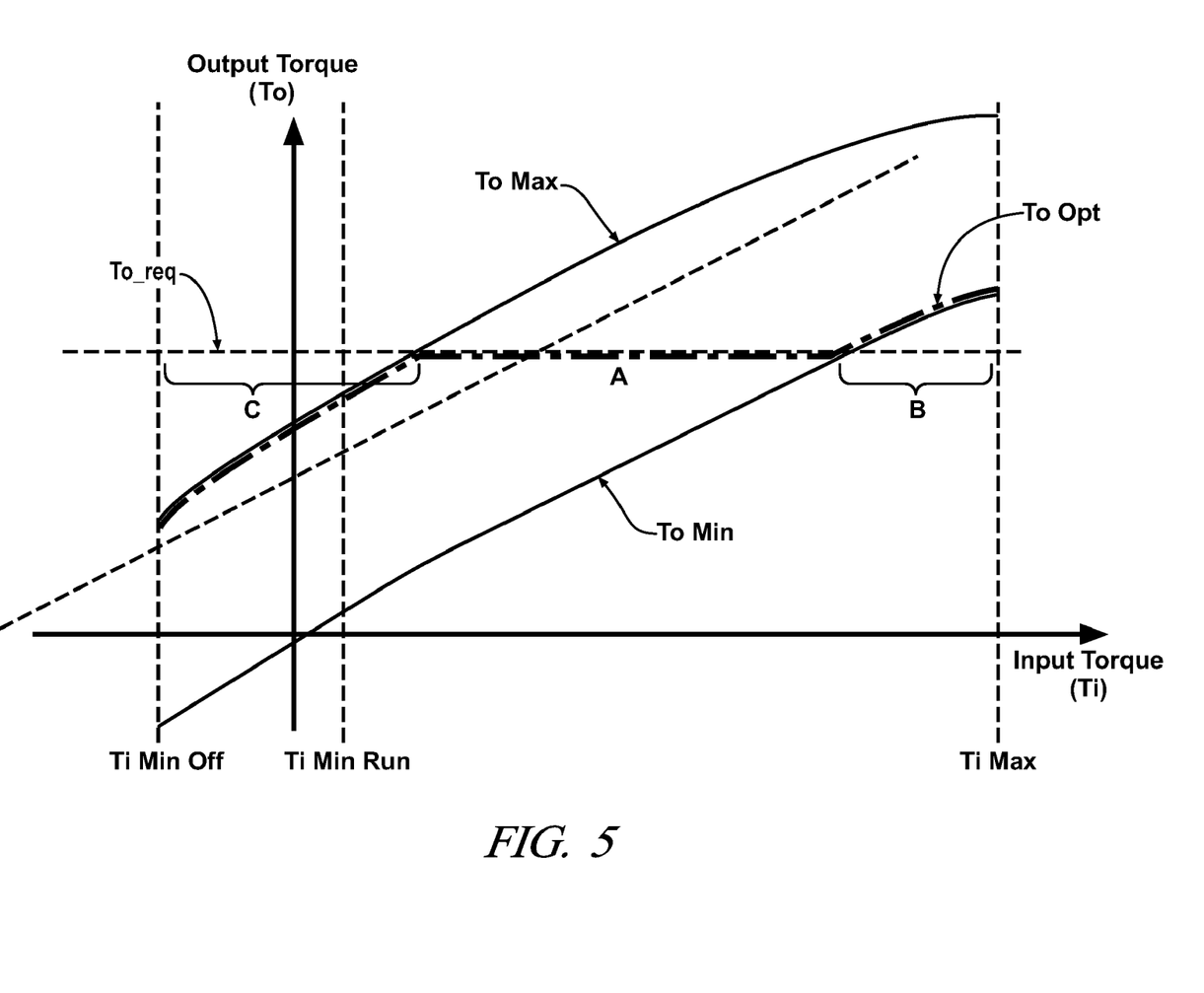
FIG. 5 is a datagraph, in accordance with the present disclosure.

FIG. 5 graphically shows output torque ('To') in relation to input torque ('Ti') for an exemplary system operating at an operating point illustrating operation of the system described herein, and include input and output torques at a fuel cutoff state ('Ti Min Off'), a minimum engine running state ('Ti Min Run') and a maximum engine running state ('Ti Max') which represent the permissible range of input operating points in this example. Output torque is plotted for the input operating points, and lines depicting maximum and minimum output torques corresponding to the input torques for the exemplary system are plotted ('To Max' and 'To Min'), along with a line comprising an operator torque request ('To_req'), comprising a predicted accelerator output torque request in the example. A second line ('To Opt') is depicted, representing the preferred output torque determined based upon the input torque using the system described hereinabove with reference to FIGS. 4 and 6. The preferred output torque is equal to the operator torque request within the maximum and minimum output torques. The preferred output torque is equal to the minimum output torque when the operator torque request is less than the minimum output torque, and is equal to the maximum output torque when the operator torque request is greater than the maximum output torque. For this example, line segment A depicts a range of input torques in which the output torque from the powertrain system achieves the operator torque request, shown as the portion of the operator torque request line ('To_req') that is bounded or lies between the maximum and minimum output torque lines. Line segment B depicts a range of input torques in which the output torque from the powertrain system exceeds the operator torque request, within the ranges of motor torques for the torque machines, e.g., the first and second electric machines 56 and 72, and within the available power range from the energy storage device, e.g., the ESD 74. When the powertrain system operates at an input torque in this region, operating costs in terms of excess fuel consumed while achieving the operator torque request are excess. Line segment C depicts a range of input torques in which the output torque from the powertrain system can not achieve the operator torque request within the ranges of motor torques and torque constraints for the torque machines and within the available power range from the energy storage device. The powertrain system underperforms. Operating at an input torque in the region depicted by line segment C results in powertrain underperformance.

Thus, during execution of the strategic optimization control scheme 310 and the tactical control scheme 330, search schemes are executed to evaluating candidate engine operating points to determine a preferred engine operating point and an associated preferred operating cost for operating the powertrain system in response to the operator torque request. The permissible range of input operating points to the input member can be determined, and candidate input operating points within the permissible range of input operating points can be evaluated to determine maximum and minimum achievable output torques transferable to the output member for the candidate engine operating point within ranges of motor torques for the torque machines, e.g., the first and second electric machines 56 and 72, and within the available power range from the energy storage device, e.g., ESD 74, in one of the operating range states. The operator torque request is determined based upon the operator inputs to the accelerator pedal 113 and the brake pedal 112. However the preferred output torque command is bounded, or limited, to be within the maximum and minimum achievable output torques. This is represented by the line segment A shown in FIG. 5. When the candidate input operating point results in a preferred output torque that is within the maximum and minimum achievable output torques, a power cost is determined that is associated with the candidate engine operating point for operating the hybrid transmission to achieve the output torque command which comprises the operator torque request. When the candidate input operating point results in a preferred output torque that is outside one of the maximum and minimum achievable output torques, a power cost and a second penalty cost are determined that are associated the candidate engine operating point for operating the hybrid transmission. Furthermore, the output torque command is bounded and thus limited to either the maximum output torque or the minimum output torque. Therefore, the search scheme does not prevent operation at the candidate input torque, but does have an increased cost associated therewith, thus reducing likelihood that the candidate engine operating point is selected as a preferred engine operating point. Thus, a preferred engine operating point, including a preferred engine state can be selected. When executing searches in the strategic optimization control scheme 310, a preferred operating range state can be selected comprising an engine operating point and an operating range state that minimize costs.

The method and system are described hereinabove with reference to an embodiment including the engine 14 and the first and second electric machines 56 and 72 mechanically connected to the electro-mechanical transmission 10. Alternatively, the system can be used with other electro-mechanical transmission systems (not shown) which have three or more electric machines. Alternatively, the system can be used with other hybrid transmission systems (not shown) which utilize torque-generative machines and energy storage systems, e.g., hydraulic-mechanical hybrid transmissions.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

I claim:

1. Method for operating a powertrain system including a hybrid transmission device, an engine, and a plurality of torque machines connected to an energy storage device, the transmission device selectively operative in one of a plurality of transmission operating range states to transfer power between the engine and the torque machines and an output member, the method comprising:
    implementing a powertrain control scheme including a first control scheme operative to determine a preferred engine input speed and a preferred transmission operating range state, a second control scheme operative to determine a preferred engine operating point, and a third control scheme operative to determine an output torque command and motor torque commands for the torque machines;
    executing the first control scheme to determine the preferred engine input speed and the preferred transmission operating range state based upon an operator torque request and a present output member speed;
    determining a present engine input speed;
    executing the second control scheme to determine the preferred engine operating point based upon the operator torque request, the preferred engine input speed, the present engine input speed, power costs and the preferred transmission operating range state;
    commanding engine operation based upon the preferred engine operating point;
    determining a present engine operating point and a present transmission operating range state; and
    executing the third control scheme to determine the motor torque commands for the torque machines based upon the output torque command, the present engine operating point, and the present transmission operating range state.

2. The method of claim 1, further comprising:
    determining a permissible range of engine operating points;
    determining ranges of motor torques for the torque machines;
    determining an available power range from the energy storage device;
    selecting a candidate engine operating point within the permissible range of engine operating points;
    determining maximum and minimum achievable output torques transferable to the output member for the candidate engine operating point within the ranges of motor torques for the torque machines and within the available power range from the energy storage device for each of a plurality of candidate transmission operating range states.

3. The method of claim 2, further comprising:
    monitoring operator inputs to an accelerator pedal and a brake pedal;
    determining the operator torque request based upon the operator inputs to the accelerator pedal and the brake pedal; and
    bounding the output torque command within the maximum and minimum achievable output torques transferable to the output member for the candidate engine operating point.

4. The method of claim 3, further comprising:
    selecting a plurality of candidate engine operating points within the permissible range of engine operating points;
    determining maximum and minimum achievable output torques transferable to the output member for each of the plurality of candidate engine operating points achievable within the ranges of motor torques for the torque machines and within the power range from the energy storage device;
    determining the power cost associated with each of the plurality of candidate engine operating points for operating the hybrid transmission to achieve the output torque command;
    assigning a second cost associated with each of the plurality of candidate engine operating points when the output torque command does not meet the output torque request for the candidate engine operating point; and
    selecting one of the plurality of the candidate engine operating points having minimum power and second costs as the preferred engine operating point.

5. The method of claim 4, further comprising:
    selecting a plurality of candidate engine operating points within the permissible range of engine operating points;
    determining a preferred engine operating point comprising the candidate engine operating point having minimum power and second costs for each of the plurality of candidate transmission operating range states; and
    selecting one of the plurality of the candidate transmission operating range states having a preferred engine operating point having minimum power and second costs as the preferred transmission operating range state.

6. The method of claim 1, wherein the preferred engine operating point and the present engine operating point comprise engine power.

7. The method of claim 1, wherein the preferred engine operating point and the present engine operating point comprise engine torque.

* * * * *